US012383937B2

(12) United States Patent
Kruepke et al.

(10) Patent No.: US 12,383,937 B2
(45) **Date of Patent: *Aug. 12, 2025**

(54) DRAIN CLEANER FLUID MANAGEMENT

(71) Applicant: Ridge Tool Company, Elyria, OH (US)

(72) Inventors: Scott Kruepke, Valley City, OH (US); Glen R. Chartier, Avon Lake, OH (US); Robert Skrjanc, Lorain, OH (US)

(73) Assignee: Ridge Tool Company, Elyria, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,484

(22) Filed: Oct. 4, 2023

(65) Prior Publication Data

US 2024/0024931 A1 Jan. 25, 2024

Related U.S. Application Data

(60) Division of application No. 17/345,091, filed on Jun. 11, 2021, now Pat. No. 11,826,798, which is a continuation of application No. 16/215,812, filed on Dec. 11, 2018, now Pat. No. 11,072,004.

(60) Provisional application No. 62/598,538, filed on Dec. 14, 2017.

(51) Int. Cl.
*B08B 9/02* (2006.01)

(52) U.S. Cl.
CPC .................................... *B08B 9/02* (2013.01)

(58) Field of Classification Search
CPC ........................................................ B08B 9/02
See application file for complete search history.

(56) References Cited

U.S. PATENT DOCUMENTS

2015/0328393 A1 11/2015 Stephens et al.
2018/0142458 A1 5/2018 Bowles et al.
2019/0184434 A1 6/2019 Kruepke et al.
2020/0179994 A1 6/2020 Kruepke et al.

FOREIGN PATENT DOCUMENTS

CN 106795710 5/2017
CN 107199215 A 9/2017

OTHER PUBLICATIONS

Operator's Manual for K-60SP (52 pages, 2004): Earliest identified publication Jun. 2003.
Parts List for K-60SP (2 pages, 2008).
Chinese Office Action and Search Report dated Dec. 21, 2024; CN application No. 202110959855.7; 7 pages.

*Primary Examiner* — Jason Y Ko
(74) *Attorney, Agent, or Firm* — Erik J. Overberger; RANKIN, HILL & CLARK LLP

(57) ABSTRACT

Drain cleaning machines having various fluid management provisions are described. The various fluid management provisions serve to direct and collect fluid and debris carried with a drain cleaning cable undergoing retraction into the machine.

20 Claims, 10 Drawing Sheets

DRAIN CLEANER FLUID MANAGEMENT

CROSS REFERENCES TO RELATED APPLICATIONS

This application claims priority from U.S. nonprovisional application Ser. No. 17/345,091 filed Jun. 11, 2021, which claims priority from U.S. nonprovisional application Ser. No. 16/215,812 filed Dec. 11, 2018, which claims priority from U.S. provisional application Ser. No. 62/598,538 filed on Dec. 14, 2017.

FIELD

The present subject matter relates to drain cleaning equipment and particularly drain cleaning machines using drain cleaning cables that are retracted relative to the machine.

BACKGROUND

When using a drain cleaning machine and retrieving a drain cleaning cable from a drain, a fair to significant amount of liquid is brought up out of the drain with the cable. In addition, the retracted drain cleaning cable often includes saturated blockage remnants and other debris that are intertwined with the drain cleaning cable during or after the blockage is cleared.

As the cable enters the machine, entrained liquid collects on various components of the machine and/or pools on the floor around the machine. Contact between the liquid and a machine's mechanical or electrical components, particularly prolonged contact, can result in catastrophic damage to the machine. In addition, runoff of liquid from the machine and/or cable can contaminate locations at which the machine may be stored, such as a user's home, business, or the like.

Accordingly, in view of these and other concerns, a need exists for a means by which contact between the liquid and a machine's mechanical or electrical components is avoided or significantly reduced. In addition, a need exists for a means by which contamination from liquid runoff can be avoided or significantly reduced.

SUMMARY

The difficulties and drawbacks associated with previous approaches are addressed in the present subject matter as follows.

In one aspect, the present subject matter provides a drain cleaning machine comprising a frame, a clutch assembly configured to engage and impart axial rotation to a drain cleaning cable, and a housing portion extending and configured about the clutch assembly for providing an interior region for containing liquid.

In another aspect, the present subject matter provides a drain cleaning machine comprising a frame, a clutch assembly configured to engage and impart axial rotation to a drain cleaning cable, and a bottom cover of the machine. The bottom cover includes a fluid reservoir.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
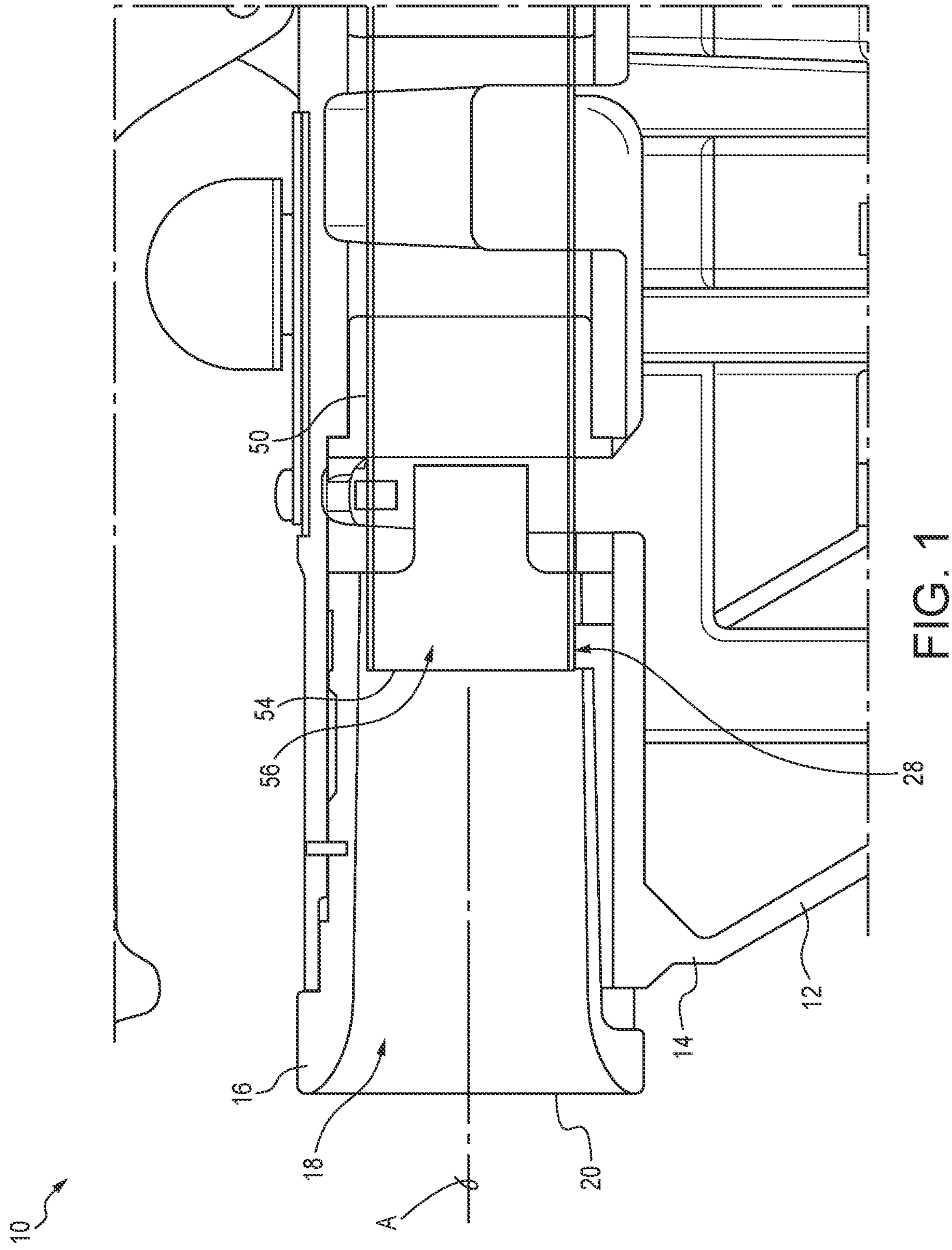
FIG. 1 is a schematic cross sectional view illustrating initial fluid redirection provisions by an embodiment of a drain cleaning cable entryway in accordance with the present subject matter.
Figure 2:
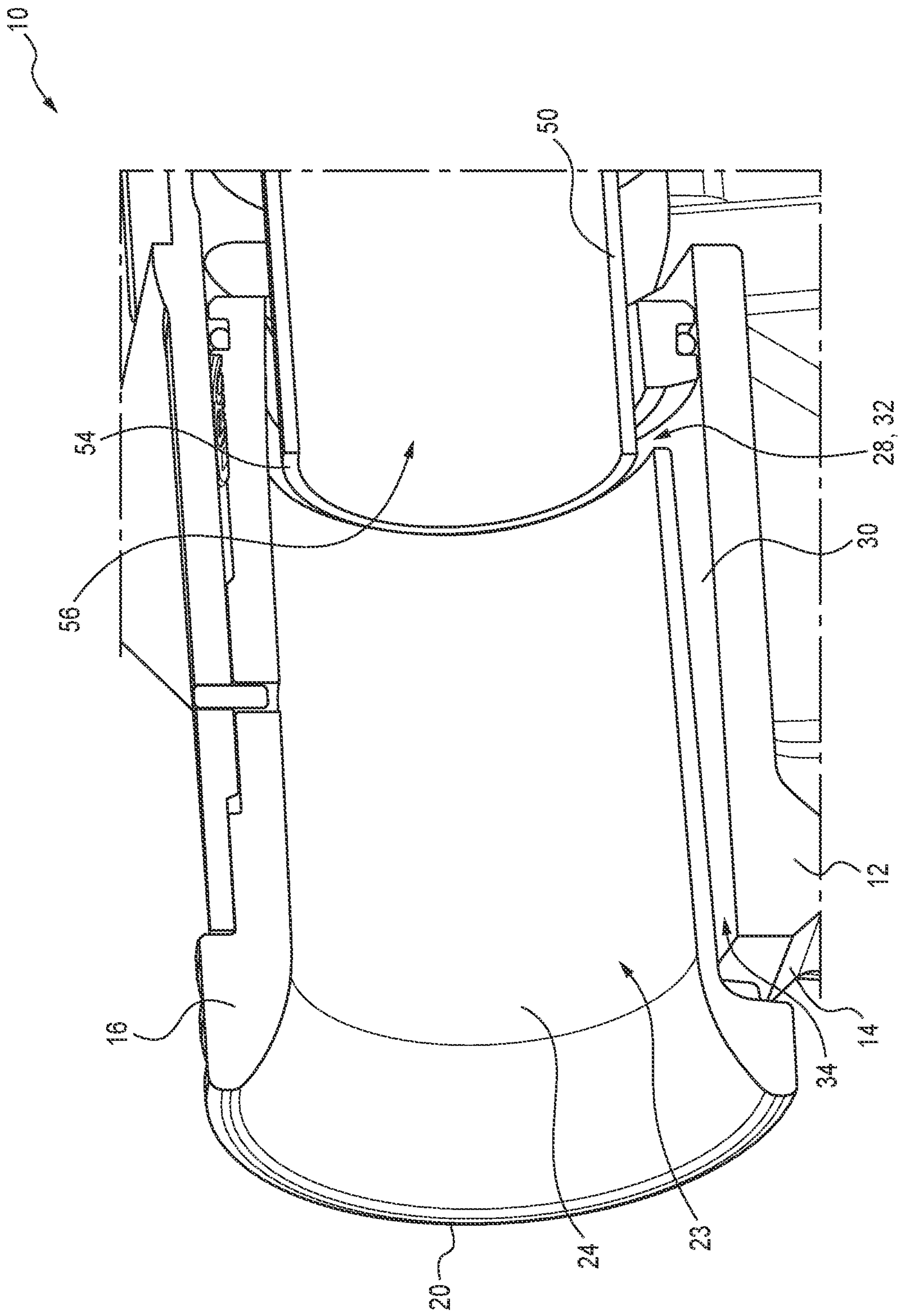
FIG. 2 is a partial cut away perspective view depicting additional details of the drain cleaning cable entryway in accordance with the present subject matter.
Figure 4:
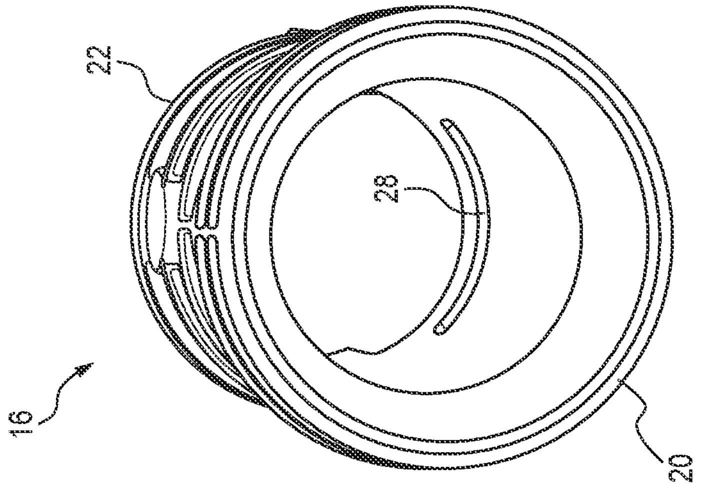
FIG. 4 is a perspective end view of the drain cleaning cable entryway of FIG. 2.
Figure 3:
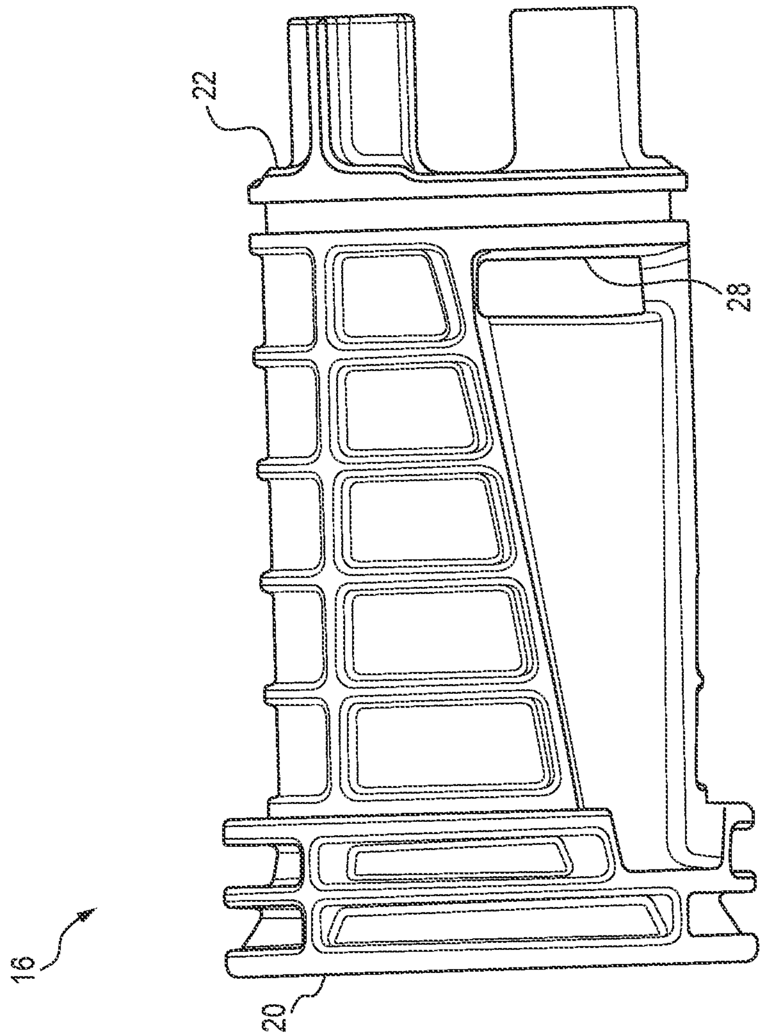
FIG. 3 is a bottom view of the drain cleaning cable entryway of FIG. 2.

The present subject matter applies to drain cleaning equipment that utilizes a drain cleaning cable which is extended into and/or retrieved from a drain or other passage or region.

The present subject matter could further apply to any application in which an extendable component such as a tool is subjected to liquid contact and then is brought into proximity with a mechanical or electrical assembly susceptible to damage resulting from contact or exposure to the liquid.

The present subject matter significantly reduces the potential of liquid runoff from contacting a machine's mechanical or electrical components in which potentially catastrophic damage to the machine could happen. Further, the present subject matter allows the runoff to be controlled and collected prior to, or when the user has relocated the machine to an appropriate location such as for example, outside of a customer's home, business, or the like.

The present subject matter provides various fluid management provisions which when incorporated in a drain cleaning machine for example, significantly reduce the potential for damage to the machine and/or enable collection of the fluid in a controlled fashion so as to avoid potential damage to the machine's mechanical and electrical components. The various fluid management provisions may be utilized independently of each other, or may be utilized in combination with each other, either partially or entirely.

The various fluid management provisions may be incorporated or used in a wide array of drain cleaning machines. Generally, such machines include a frame or housing, an assembly for engaging and imparting axial rotation to a drain cleaning cable such as for example a clutch assembly, and controls enabling an operator to selectively govern use and operation of the machine. Depending upon the type of drain cleaning machine, the machine may also include an assembly for extending and/or retracting the drain cleaning cable relative to the machine. Nonlimiting examples of drain cleaning machines include drain cleaning equipment and particularly sectional drain cleaning equipment available from RIDGID under the designation K-60SP Sectional Machine, and K-50 Sectional Machine. It will be understood that the present subject matter could potentially be used with a wide array of other drain cleaning machines and equipment.

The various fluid management provisions can be utilized in association with a variety of drain cleaning cables. Nonlimiting examples of such drain cleaning cables include those available from RIDGID under the designation Drum Cables and Sectional Cables. Such cables are typically in the form of helically wound metal wire forming a flexible coiled member having a diameter typically 5⁄16 inches (8 mm), 3⁄8 inches (10 mm), 5⁄8 inches (16 mm), 7⁄8 inches (22 mm), or 1¼ inches (32 mm); and a length of from about 10 feet (3.1 m) to about 50 feet (15.6 m). It will be understood that the present subject matter could be utilized with other cable or member sizes and configurations, and is not limited to the cables described herein.

The fluid management provisions of the present subject matter include (i) initial fluid redirection provisions, (ii) secondary fluid redirection provisions, (iii) tertiary fluid redirection provisions, and (iv) final fluid collection provisions. Each of these provisions are further described herein and illustrated in the referenced figures. Although the present subject matter is described in the context of redirecting and/or collecting liquid runoff resulting from withdrawing a drain cleaning cable from a drain, it will be understood that a wide array of applications are contemplated and in no way is the subject matter limited to drains, drain cleaning, or operations involving retracting a drain cleaning cable. Instead, applications involving nearly any passage or region containing water or other liquid in which an extendable drain cleaning cable or other flexible member is to be used to clear or remove blockage, are within the scope of the present subject matter. Furthermore, and as previously noted, the present subject matter could potentially be utilized in nearly any machine in which an extendable cable or tool entrained with liquid, is retracted into the machine.

Initial Fluid Redirection Provisions

These provisions are provided in a drain cleaning machine at or proximate a first point of contact of a returning drain cleaning cable from a drain or other external location, to the machine. These provisions feature a cable entryway incorporated in the machine to collect any runoff and funnel or direct this liquid to a location outside of the machine, away from the machine's mechanical and electrical components. A runoff drain channel as described in greater detail can be provided as part of the cable entryway.

FIGS. 1-4 illustrate portions of a drain cleaning machine 10 and a cable entryway 16 in accordance with the present subject matter. Cable entryway 16 and its incorporation in the machine 10 are an example of initial fluid redirection provisions as described herein.

Specifically, FIG. 1 is a schematic cross sectional view depicting a portion of the drain cleaning machine 10 having a housing or frame 12 and defining a face end 14 of the machine 10. The face end 14 is the end of the machine 10 typically directed toward the drain to be cleared or unblocked by use of the machine 10. The machine 10 and/or cable entryway 16 defines a generally hollow interior region 18 through which a drain cleaning cable (not shown) may pass as the cable extends to a location in the machine at which a clutch assembly of the machine engages the cable. The drain cleaning machine 10 may also comprise an adjustment shaft 50 for adjusting or setting the clutch. Typically, the adjustment shaft 50 is tubular in shape and the drain cleaning cable extends through a hollow interior region 56 of the shaft 50. The adjustment shaft 50 defines a distal end 54, and an opposite proximal end 52 (shown in later referenced figures) located near the clutch. The terms "proximal" and "distal" are with regard to the interior or center of the drain cleaning machine. Thus, a distal end of a component of the machine is typically located closer to the face end of the machine or its frame as compared to the proximal end of that component.

In this embodiment of the initial fluid redirection provisions, the cable entryway 16 is disposed at or along the face end 14 of the drain cleaning machine 10. The cable entryway 16 defines a distal end 20, an opposite proximal end 22, and a hollow interior 23 extending between the distal end 20 and the proximal end 22. In certain versions, the cable entryway 16 includes an interior circumferential wall 24 that transitions to an enlarged span or diameter at the distal end 20. Thus, in such versions of the cable entryway 16, the opening span at the distal end 20 is greater than the opening span at the proximal end 22. However, it will be appreciated that the present subject matter is not limited to this particular configuration and instead includes a wide array of other geometries for the cable entryway.

In certain versions, the cable entryway 16 also defines a channel aperture 28 at a location adjacent or near the proximal end 22. The channel aperture 28 is typically in the form of a slot shaped opening in a wall of the cable entryway 16. However, the channel aperture 28 can be provided in other shapes and configurations. The present subject matter also includes the use of a plurality of apertures 28.

In particular versions of the cable entryway 16, one or more optional channels or recessed regions (not shown) may be defined along the interior wall 24 of the cable entryway 16. Typically, the channels are oriented so as to direct liquid within the interior 23 of the cable entryway 16 toward the aperture 28. In a particular version, the channel aperture 28 is located at least partially within the channels. This configuration promotes collection of liquid from within the interior 23 of the cable entryway into and through the channel aperture 28.

The cableway 16 is incorporated, assembled, or formed within the drain cleaning machine 10 such that the distal end 20 of the cableway 16 is located along or near the face end 14 of the machine 10. Thus, the proximal end 22 of the cableway is disposed within the interior of the machine 10. In certain versions, the cableway 16 is oriented such that its longitudinal axis, shown in FIG. 1 as axis A, is horizontal or substantially so. The present subject matter includes other orientations such as ±20° or less relative to axis A. The cableway 16 is also positioned within the machine 10 such that the channel aperture 28 is located at a bottommost position of the cable entryway 16. As will be understood, this position promotes drainage of liquid from the interior 23 of the cable entryway 16.

In drain cleaning machines 10 utilizing an adjustment shaft 50, the cable entryway 16 is also sized and positioned to extend about a distal end 54 of the shaft 50 and in many versions to telescopically extend about the distal end 54 of the shaft 50 at all axial positions of the shaft 50 as assembled in the machine 10. Thus, regardless of the axial position of the shaft 50, the distal end 54 of the shaft 50 is within the hollow interior 23 of the cable entryway 16. This configuration promotes collection of liquid within the cable entryway 16. It is also contemplated that the adjustment shaft 50 could include one or more apertures extending through its wall, and/or one or more optional channels or recessed regions to direct liquid out of the shaft 50 and into the cable entryway 16.

In particular versions of the drain cleaning machine 10 having the cable entryway 16, the assembly includes an initial drain passage 30 located under the cable entryway 16. The initial drain passage 30 defines an entrance 32 and an exit 34. The entrance 32 is located under or near the channel aperture 28 of the cable entryway 16. And the exit 34 is located at or near the face end 14 of the machine 10. It will be appreciated, however, that the present subject matter includes a wide variety of shapes and configurations for the drain passage 30.

In the configuration and positioning of the cable entryway 16 in the machine 10, liquid from a drain cleaning cable that separates from the cable in the cable entryway 16 is directed by the optional channel(s) toward the channel aperture 28 in the cable entryway 16. Typically, this occurs during retraction or withdrawal of the cable from a drain and as the cable passes through the cable entryway 16. Upon separation from the cable, and collection of liquid in the cable entryway 16, liquid passes through the channel aperture 28 into the initial drain passage 30 and typically into the entrance 32 of that passage 30. The liquid then flows through the passage 30 toward the exit 34 at which the liquid drains from the machine 10. This configuration ensures that the noted liquid does not contact mechanical or electrical components located within the interior of the machine 10.

In many versions of the present subject matter, the cable entryway 16 is formed from a material different than the material(s) used for forming the frame 12 of the machine 10. Likewise, for machines 10 utilizing an adjustment shaft 50, the material of the cable entryway 16 is different than the material, e.g., metal, of the adjustment shaft 50. In many versions, the cable entryway 16 is formed from a moldable polymeric material such as a polyolefin for example polyethylene and/or polypropylene.

It will be noted that the present subject matter includes a variety of different configurations for the cable entryway. In addition, it will be understood that the present subject matter initial fluid redirection provisions include other components besides or in addition to the cable entryway described herein.

Secondary Fluid Redirection Provisions

For drain cleaning machines utilizing an adjustment shaft, any fluid in the system that bypasses the initial channel and/or the cable entryway will fall short of a mechanical bushing that supports the adjustment shaft due to the secondary fluid redirection provisions. This configuration eliminates or at least significantly reducing the possibility of fluid migrating into the slide bushing and binding the operation of the adjustment shaft.

Figure 5:
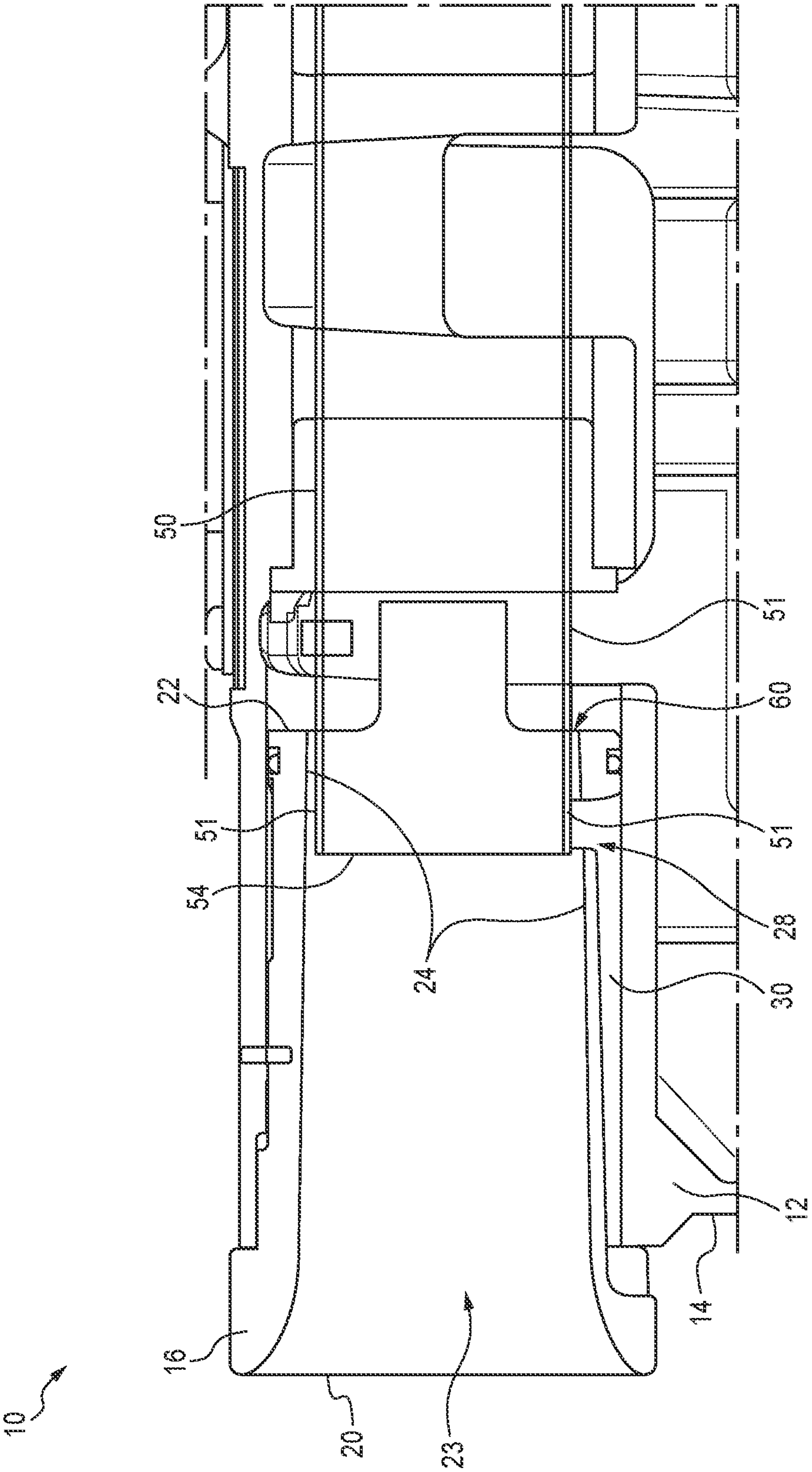
FIG. 5 is a schematic cross sectional view illustrating secondary fluid redirection provisions in accordance with the present subject matter.

FIG. 5 illustrates portions of the drain cleaning machine 10 having an adjustment shaft 50 as described herein and secondary fluid redirection provisions in accordance with the present subject matter. These provisions include a secondary drain passage defined by a gap 60 or space between the adjustment shaft 50 and the cable entryway 16. Specifically, this gap 60 extends between an outer face 51 of the shaft 50 and the inner face of the interior circumferential wall 24 of the cable entryway 16. In many versions, this gap 60 is annular shaped or substantially so since the cross sectional shapes of the shaft 50 and the cable entryway 16 are both circular.

Liquid that may travel toward the proximal end 22 of the cable entryway 16 and which does not exit the cable entryway 16 via the channel aperture 28, can exit the interior 23 of the cable entryway 16 through the gap 60 and more particularly, the annular gap defined between the adjustment shaft 50 and the cable entryway 16. Liquid exiting through this gap 60 is directed out of the machine 10 and in many versions, flows within the previously described initial drain passage 30. In addition or alternatively, excess liquid escaping via gap 60 flows through or under the channel aperture 28 and into the drain passage 30.

It will be understood that the secondary fluid redirection provisions may include other aspects and/or components besides or in addition to the version described herein.

Tertiary Fluid Redirection Provisions

Any fluid that remains with the drain cleaning cable within the adjustment shaft or near the proximal end of the adjustment shaft is dispersed out of the system via the tertiary fluid redirection provisions. In the representative embodiment described herein, these provisions feature radial exits prior to the primary system bearings. These exits minimize the amount of liquid that can contact the primary system mechanical bearings. And in particular versions, these exits direct all liquid in or around the proximal end of the adjustment shaft, away from the noted bearings.

Figure 6:
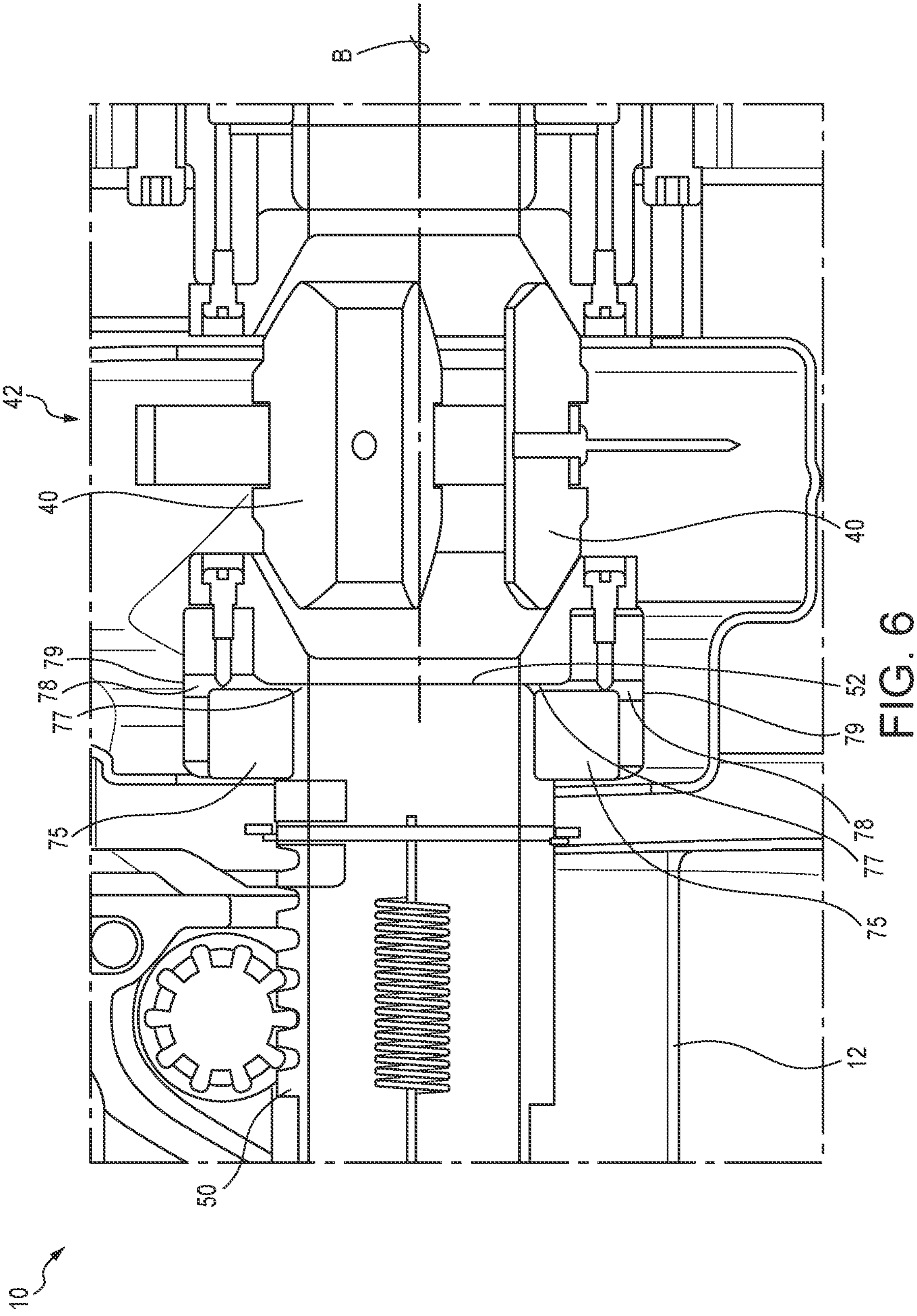
FIG. 6 is a schematic cross sectional view illustrating tertiary fluid redirection provisions in accordance with the present subject matter.
Figure 7:
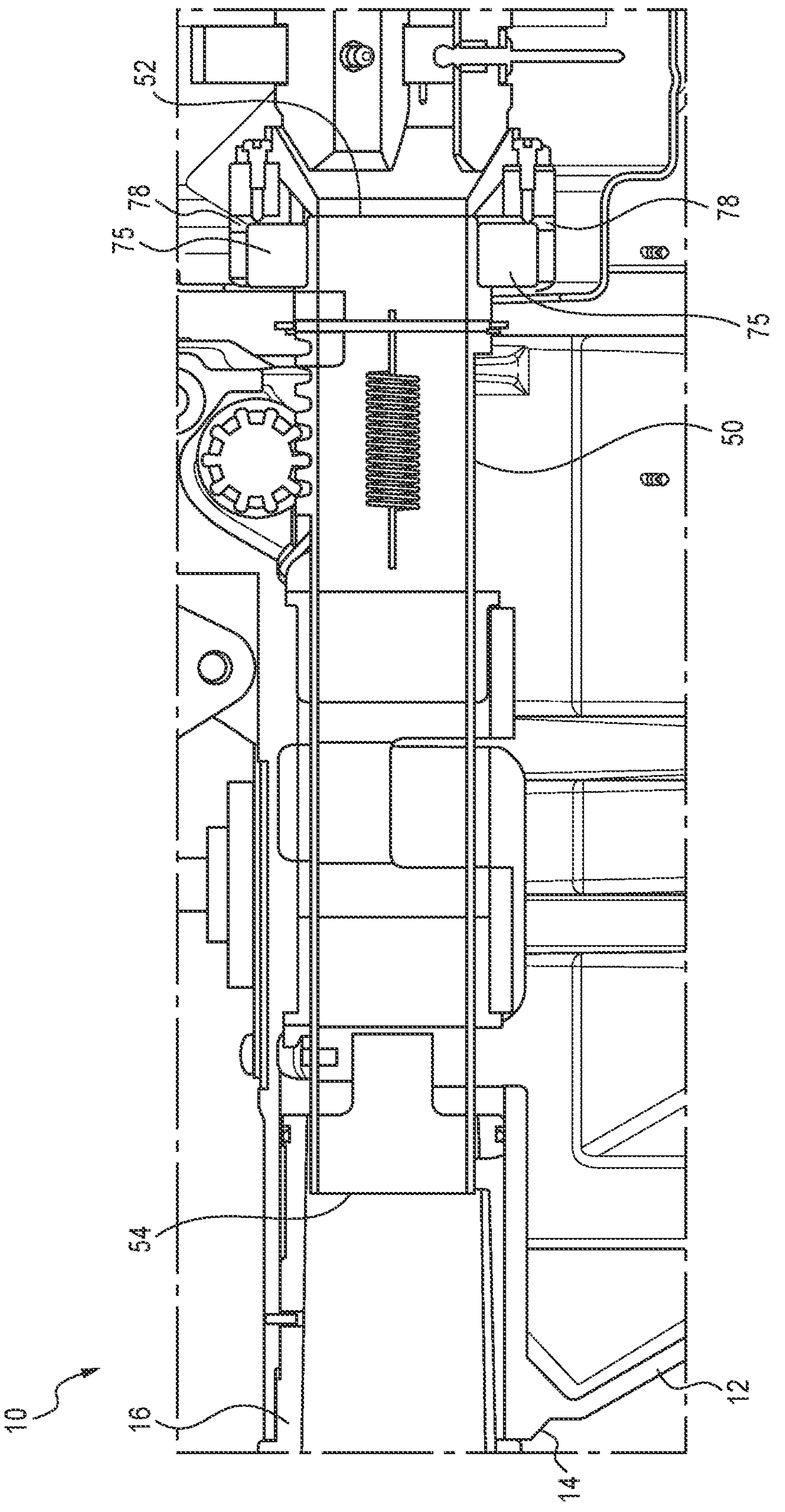
FIG. 7 is a schematic cross sectional view showing additional details of the tertiary fluid redirection provisions.
Figure 8:
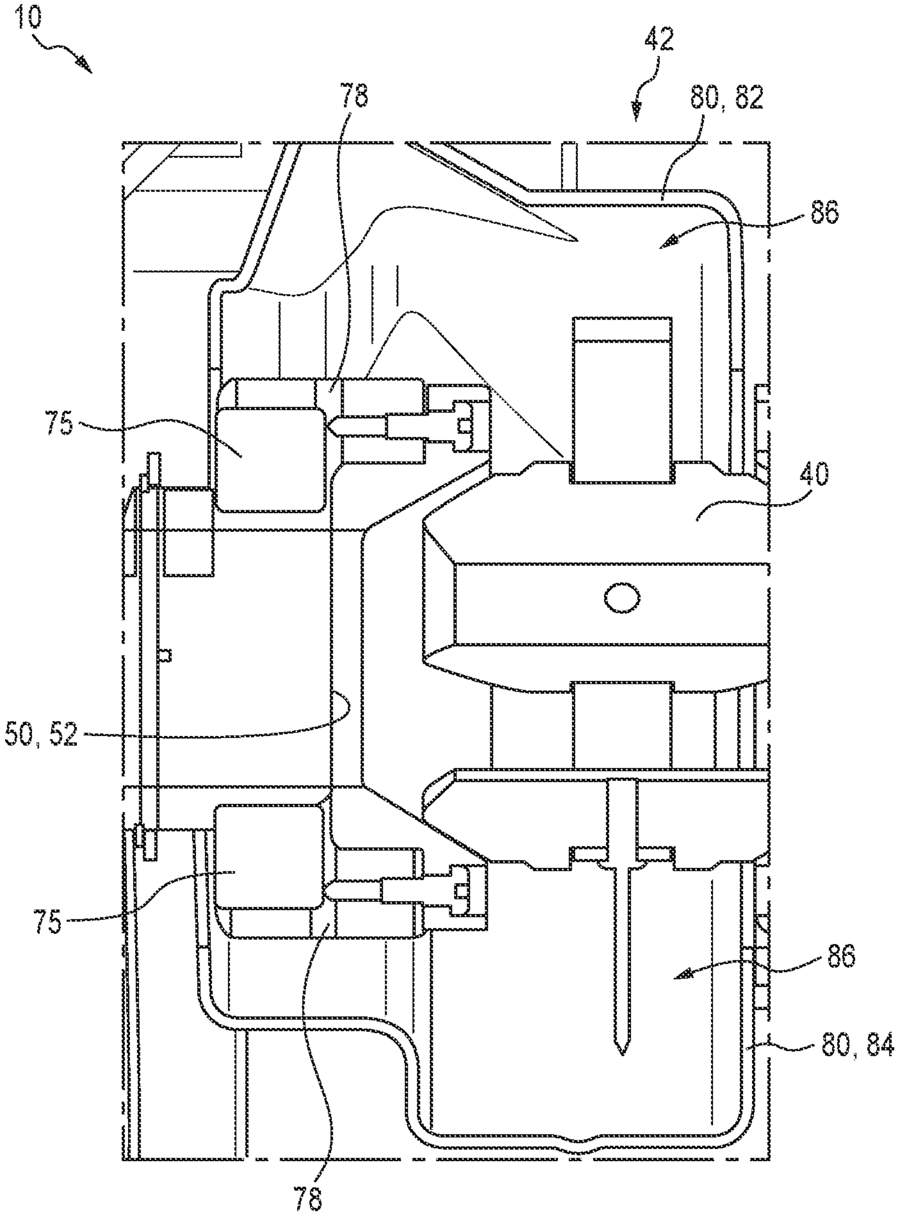
FIGS. 8-11 are various schematic and partial views illustrating final fluid collection provisions in accordance with the present subject matter.
Figure 9:
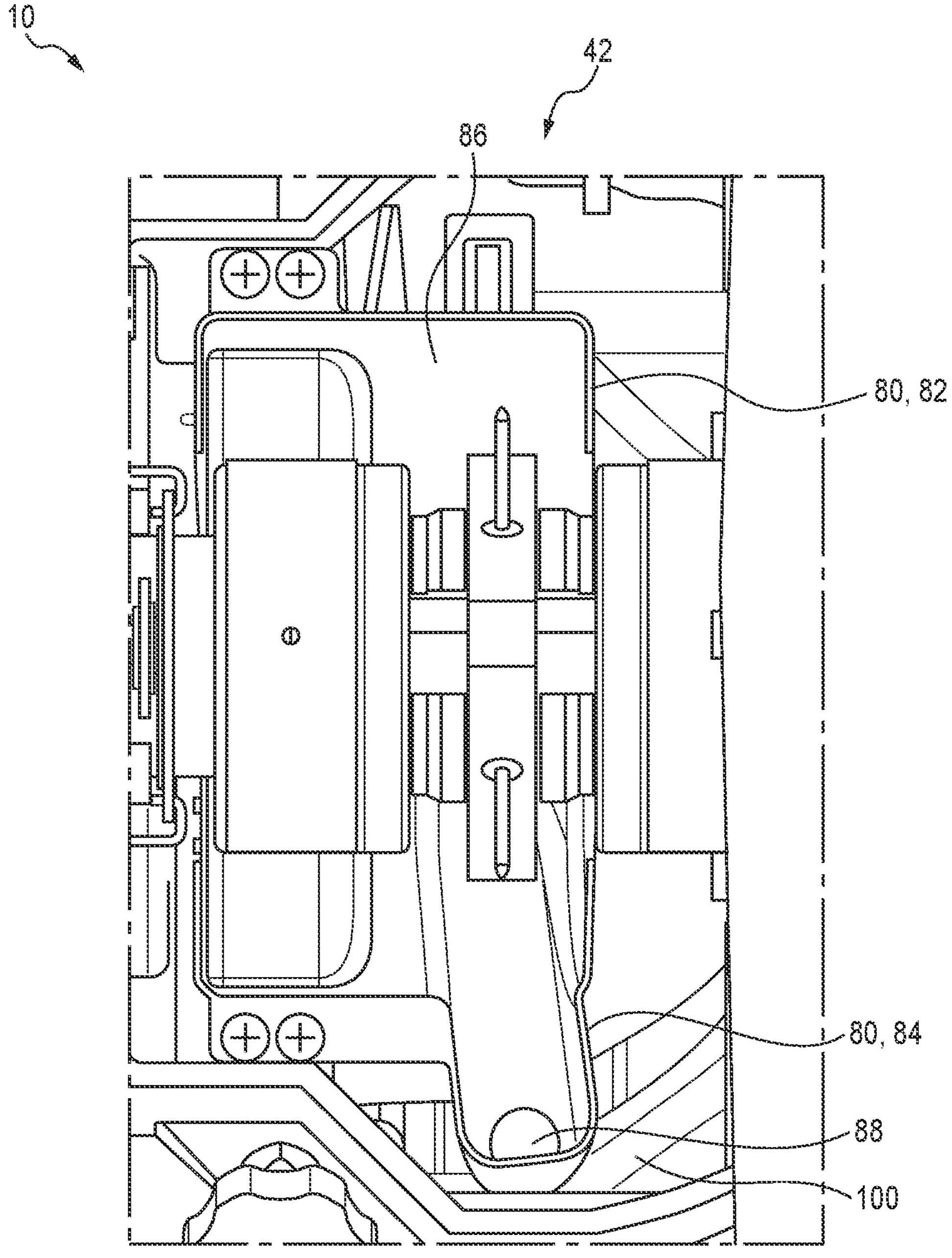
Figure 10:
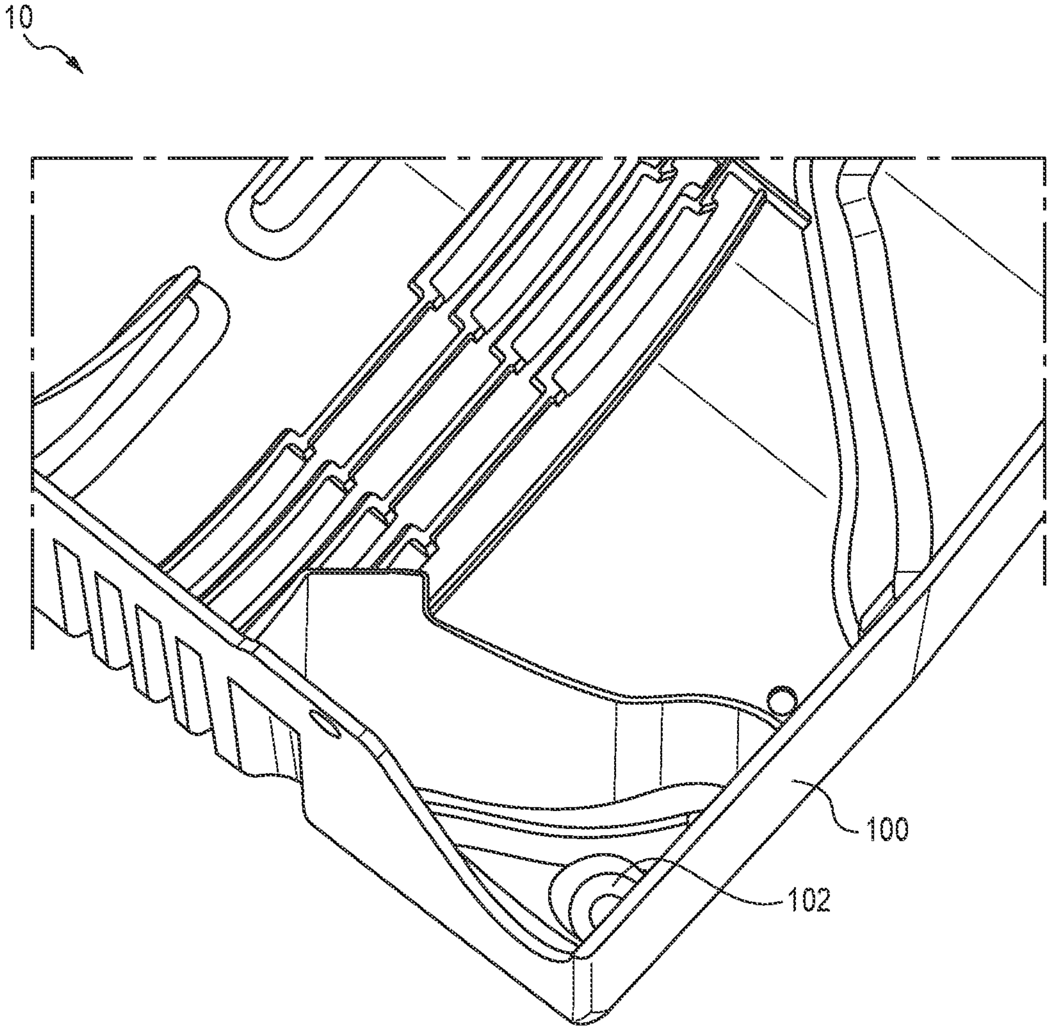
Figure 11:
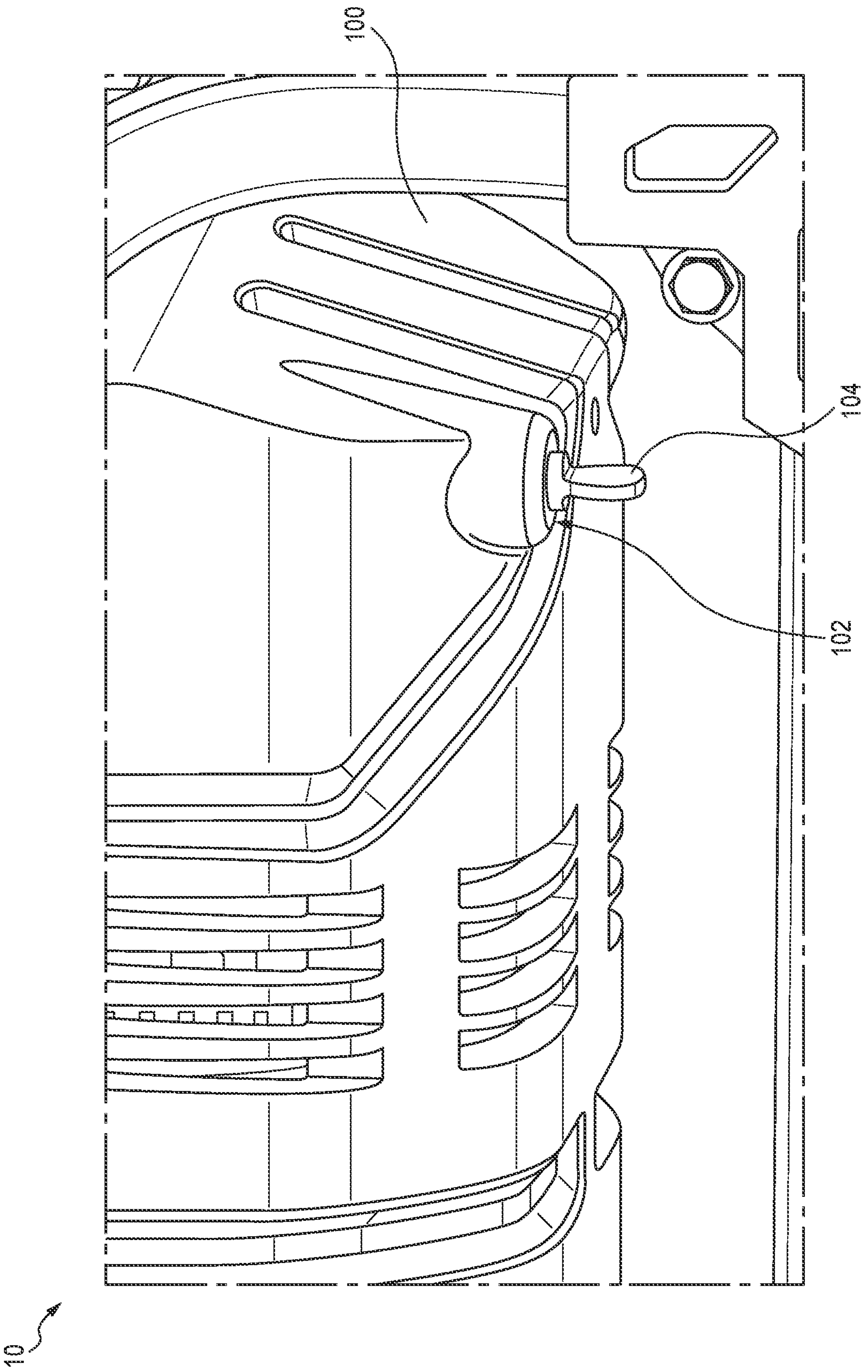

FIGS. 6 and 7 illustrate a version of the tertiary fluid redirection provisions in accordance with the present subject matter. These provisions are provided between the face end 14 of the machine 10 and a clutch assembly 42, and if the machine 10 includes an adjustment shaft 50, near the proximal end 52 of the adjustment shaft 50. In many versions, these provisions are provided immediately alongside or near the primary system bearings 75. The clutch assembly 42 comprises one or more clutch members 40 which can be selectively positioned to engage and impart axial rotation to a drain cleaning cable. In many versions, the bearings 75 rotatably support the proximal end 52 of the adjustment shaft 50. These provisions feature one or more exit ports 78 that enable or promote passage of liquid from the interior of the machine 10, to an enclosed liquid capture region described in greater detail herein. The exit ports 78 can range in number from one to ten or more. Typically, two to four exit ports are used. In particular versions, the exit ports are radially oriented relative to a longitudinal axis of the adjustment shaft and/or the center of the clutch assembly 42 shown in FIG. 6 as axis B. In many drain cleaning machines, axis B is parallel and is coextensive with axis A if the machine includes a cable entryway as previously described herein.

The one or more exit ports 78 generally extend from an entrance 77 to an exit 79. The entrance 77 of an exit port 78 is located in liquid communication with the proximal end 52 of the adjustment shaft 50. The exit 79 of an exit port 78 is located within the enclosed liquid capture region addressed in greater detail herein and referred to as a clutch enclosure.

It will be appreciated that the tertiary fluid redirection provisions can include other aspects and/or components besides or in addition to the embodiment described herein.

If liquid passes the initial, secondary, and tertiary fluid redirection provisions, the primary mechanical bearings, for example bearings 75, can be provided with double contact lip seals and pre-filled with a permanent grease to prevent contaminants from entering the bearing and producing corrosion and/or binding. The grease type and volume is selected to lubricate for the life of the bearing and not require additional grease through use. These seals and the applied grease avoid or at least significantly reduce the possibility of water ingress to the bearings that could result in catastrophic bearing failure during use.

Final Fluid Collection Provisions

The tertiary fluid redirection provisions allow fluid to exit the system into the final fluid collection provisions. Likewise, at the clutch assembly, the rotating shaft or clutch assembly can fling or otherwise disperse any excess liquid transferred from the drain such as liquid entrained with the retracted cable, outward to the final fluid collection provisions. At this point, a clutch enclosure extends around the clutch assembly completely or at least substantially so, using a top and bottom housing portions, thereby providing a controlled space for collection of returned liquid. The clutch enclosure collects the liquid to prevent runoff inside the remainder of the machine, and drains any liquid to a separate holding compartment which in certain versions is integrated within a bottom cover of the machine. This bottom cover features a dedicated compartment for storing the fluid with a drain plug that the user can retain in position when direct draining is not desired. The user can then remove the drain plug and drain and/or further collect any of the stored liquid when in an appropriate area, away from the clean jobsite.

FIGS. 8-11 illustrate portions of a drain cleaning machine 10 and final fluid collection provisions in accordance with the present subject matter. In the illustrated embodiment, the final fluid collection provisions include a clutch enclosure 80 that encloses the clutch assembly 42 such that liquid separated from a drain cleaning cable (not shown), is contained within the clutch enclosure 80, thereby preventing the liquid from contacting other components such as mechanical or electrical components within the interior of the machine 10.

Generally, the clutch enclosure 80 includes a first or top portion 82, and a second or bottom portion 84. The two portions are configured, i.e., sized and shaped, so as to be positioned or mated together to form an enclosed interior region 86 surrounding the clutch assembly 42. Although the clutch enclosure 80 is described as including top and bottom portions, the present subject matter includes enclosures including a different number of portions and/or different sectional configuration(s).

The clutch enclosure 80 defines one or more drain apertures 88. Typically, the drain apertures 88 are located along a bottommost region of the clutch enclosure 80.

Disposed under the clutch enclosure 80 is a fluid reservoir 100. The fluid reservoir 100 is configured to receive liquid captured by the clutch enclosure 80. Such liquid flows from the clutch enclosure 80 through the drain aperture(s) 88 into the fluid reservoir 100. The fluid reservoir 100 includes a liquid receiving interior, a drain aperture 102, and a drain plug 104 which selectively seals the drain aperture 102 of the fluid reservoir.

The final fluid collection provisions of the present subject matter may include additional components and/or components different than those described herein.

In one embodiment, the present subject matter provides a drain cleaning machine comprising a frame defining a face end and an interior, and an assembly for engaging and imparting rotation to a drain cleaning cable. The drain cleaning machine also comprises a cable entryway defining a distal end, a proximal end, and a hollow interior extending between the distal end and the proximal end. The cable entryway is incorporated in the machine such that the distal end of the cable entryway is located along the face end of the frame. The cable entryway further defines at least one channel aperture extending through a wall of the cable entryway.

In another embodiment, the present subject matter provides a drain cleaning machine comprising a frame defining a face end and an interior, and an assembly for engaging and imparting rotation to a drain cleaning cable. The drain cleaning machine also comprises an axially positionable adjustment shaft disposed in the interior of the frame. The adjustment shaft defines a distal end and an opposite proximal end. The drain cleaning machine also comprises a bearing assembly rotatably supporting the proximal end of the adjustment shaft. And, the drain cleaning machine comprises at least one exit port disposed alongside the bearing assembly and configured for passing liquid through the at least one exit port.

In yet another embodiment, the present subject matter provides a drain cleaning machine comprising a frame defining a face end and an interior, and a clutch assembly for engaging and imparting rotation to a drain cleaning cable. The drain cleaning machine also comprises a clutch enclosure defining a hollow interior region and a drain aperture. The clutch enclosure generally surrounds the clutch assembly and is configured to collect liquid from the hollow interior of the clutch enclosure and direct the collected liquid to the drain aperture of the clutch enclosure.

An advantage of the present subject matter drain cleaner fluid management system is reduced water ingress to the machine's functional components, e.g., bearings and/or electrical components. By reducing the potential of liquid contact to the mechanical electrical components, failure due to exposure to this liquid, resulting in corrosion, swelling, grease elimination/wash-out, or binding, will likewise be reduced. Another advantage is that the present subject matter allows the controlled drainage of any potential return liquid, allowing the user to more cleanly work at a jobsite. This cleanliness results in more efficient time use since additional cleanliness measures would not need to be taken to prevent damage to jobsite surroundings due to liquid runoff from the machine.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

The invention claimed is:

1. A drain cleaning machine comprising:
a frame;
a clutch assembly configured to engage and impart axial rotation to a drain cleaning cable;
a housing portion extending and configured about the clutch assembly for providing an interior region for containing liquid.

2. The drain cleaning machine of claim 1 wherein the housing portion is a clutch enclosure extending about the clutch assembly, the clutch enclosure including a first portion and a second portion configured to form an enclosed region surrounding the clutch assembly.

3. The drain cleaning machine of claim 2 wherein the clutch enclosure defines a first drain aperture located along a bottommost region of the clutch enclosure.

4. The drain cleaning machine of claim 3, further comprising a fluid reservoir disposed under the clutch enclosure.

5. The drain cleaning machine of claim 4, wherein the fluid reservoir further includes a second drain aperture.

6. The drain cleaning machine of claim 5, wherein the fluid reservoir further includes a drain plug for selectively sealing the second drain aperture of the fluid reservoir.

7. The drain cleaning machine of claim 2, further comprising:

a cable entryway supported on the frame and defining a hollow interior region through which the drain cleaning cable may pass, wherein the cable entryway further defines:

a distal end;

a proximal end;

a hollow interior; and an interior wall extending between the distal end and the proximal end;

wherein the cable entryway is oriented such that the distal end of the cable entryway is located along a face end of the frame.

8. The drain cleaning machine of claim 7, further comprising an adjustment shaft disposed in the hollow interior, wherein the adjustment shaft defines a distal end and an opposite proximal end, and wherein the distal end is located closer to the face end of the frame than is the proximal end.

9. The drain cleaning machine of claim 8, further comprising:

a bearing assembly rotatably supporting the proximal end of the adjustment shaft; and at least one exit port disposed alongside the bearing assembly and configured for passing liquid through the at least one exit port.

10. The drain cleaning machine of claim 9, wherein the exit port is radially oriented relative to an adjustment shaft disposed in the hollow interior.

11. The drain cleaning machine of claim 9, wherein the at least one exit port is disposed within the clutch enclosure.

12. A drain cleaning machine comprising:

a frame;

a clutch assembly configured to engage and impart axial rotation to a drain cleaning cable;

a bottom cover of the machine, the bottom cover including a fluid reservoir.

13. The drain cleaning machine of claim 12, wherein the clutch assembly is generally surrounded by a clutch enclosure having a first portion and a second portion configured to mate together and thereby define a hollow interior region.

14. The drain cleaning machine of claim 13, wherein the clutch enclosure further includes a first drain aperture.

15. The drain cleaning machine of claim 14, wherein the fluid reservoir further includes a second drain aperture and a drain plug for selectively sealing the second drain aperture.

16. The drain cleaning machine of claim 13, further comprising:

a cable entryway supported by the frame defining a hollow interior region through which the drain cleaning cable may pass, wherein the cable entryway further defines:

a distal end;

a proximal end;

a hollow interior; and an interior wall extending between the distal end and the proximal end;

wherein the cable entryway is oriented such that the distal end of the cable entryway is located along a face end of the frame.

17. The drain cleaning machine of claim 16, further comprising an adjustment shaft disposed in the hollow interior, wherein the adjustment shaft defines a distal end and an opposite proximal end, and wherein the distal end is located closer to the face end of the frame than is the proximal end.

18. The drain cleaning machine of claim 17, further comprising:

a bearing assembly rotatably supporting the proximal end of the adjustment shaft; and at least one exit port disposed alongside the bearing assembly and configured for passing liquid through the at least one exit port.

19. The drain cleaning machine of claim 18, wherein the at least one exit port is radially oriented relative to the adjustment shaft disposed in the hollow interior of the cable entryway.

20. The drain cleaning machine of claim 18, wherein the at least one exit port is disposed within the clutch enclosure.

* * * * *